United States Patent
Sykes et al.

(10) Patent No.: US 12,233,695 B1
(45) Date of Patent: Feb. 25, 2025

(54) ELECTRIC VEHICLE HAVING MOTOR SHIELD

(71) Applicant: Ford Global Technologies, LLC, Dearborn, MI (US)

(72) Inventors: Matthew Sykes, Wickford (GB); Daniel Charters, Hullbridge (GB); Tyler Powell, Benfleet (GB); Tim Winstanley, Bishops Stortford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/366,474

(22) Filed: Aug. 7, 2023

(51) Int. Cl.
*B60K 1/00* (2006.01)
*B60L 50/60* (2019.01)
*B62D 21/02* (2006.01)
*B62D 21/11* (2006.01)
*B62D 27/02* (2006.01)

(52) U.S. Cl.
CPC ............... *B60K 1/00* (2013.01); *B62D 21/02* (2013.01); *B62D 21/11* (2013.01); *B62D 27/023* (2013.01); *B60L 50/60* (2019.02)

(58) Field of Classification Search
CPC .......... B60K 1/00; B62D 21/02; B62D 21/11; B60L 50/60
See application file for complete search history.

(56) References Cited

U.S. PATENT DOCUMENTS

| | | | |
|---|---|---|---|
| 3,708,028 A * | 1/1973 | Hafer | H01M 50/249 104/34 |
| 4,339,015 A * | 7/1982 | Fowkes | B60L 50/62 180/68.5 |
| 5,559,420 A * | 9/1996 | Kohchi | B60L 50/66 280/492 |
| 6,390,215 B1 * | 5/2002 | Kodama | B60L 50/62 180/2.1 |
| 6,402,229 B1 * | 6/2002 | Suganuma | B62D 21/15 180/311 |

(Continued)

FOREIGN PATENT DOCUMENTS

| | | | | |
|---|---|---|---|---|
| CN | 108357565 | | 8/2018 | |
| CN | 111942473 A | * | 11/2020 | ............... B60K 1/04 |
| CN | 113232728 A | * | 8/2021 | ............... B60K 1/04 |

OTHER PUBLICATIONS

Translation of CN-113232728-A—Aug. 10, 2021 (Year: 2021).*
Translation of CN-111942473-A—Nov. 17, 2020 (Year: 2020).*

*Primary Examiner* — Paul N Dickson
*Assistant Examiner* — Shams Dhanani
(74) *Attorney, Agent, or Firm* — Burris Law, PLLC (57) ABSTRACT

An electric vehicle includes a pair of opposed longitudinal outer rails, a plurality of cross beams, a pair of opposed longitudinal inner rails, a housing and a plurality of bushings. The cross beams extend in a transverse direction of the electric vehicle and include first and second cross beams secured to the pair of opposed longitudinal outer rails. The pair of opposed longitudinal inner rails are located inboard of the pair of opposed longitudinal outer rails and between the first and second cross beams. The pair of opposed longitudinal inner rails are secured to the first and second cross beams to form a box. The housing is connected to the box and is configured to be connected to the motor. The bushings are at least partially supported by the housing.

20 Claims, 11 Drawing Sheets

(56) References Cited

U.S. PATENT DOCUMENTS

| | | | | |
|---|---|---|---|---|
| 7,533,748 | B2* | 5/2009 | Miyajima | H01M 8/247 903/952 |
| 7,610,978 | B2* | 11/2009 | Takasaki | B62D 25/20 429/96 |
| 8,365,849 | B2* | 2/2013 | Bartel | B60L 7/10 303/146 |
| 8,789,635 | B2* | 7/2014 | Franzen | B60L 15/38 180/68.5 |
| 8,989,941 | B2* | 3/2015 | Aemisegger | B60L 3/0061 701/42 |
| 9,840,280 | B2* | 12/2017 | Wolf-Monheim | B62D 21/11 |
| 9,926,017 | B1* | 3/2018 | Hamilton | B62D 25/20 |
| 9,956,992 | B1* | 5/2018 | Iimi | B62D 25/08 |
| 10,899,213 | B2* | 1/2021 | Baccouche | B60K 1/04 |
| 10,967,722 | B2* | 4/2021 | Tanaka | B60L 50/64 |
| 11,569,539 | B1* | 1/2023 | Stoddart | B60K 1/00 |
| 12,145,651 | B2* | 11/2024 | Eklund | B62D 21/155 |
| 2005/0116459 | A1* | 6/2005 | Ito | B62D 21/02 280/788 |
| 2005/0194817 | A1* | 9/2005 | Osato | B62D 21/152 296/187.01 |
| 2010/0101885 | A1* | 4/2010 | Nozaki | B60K 1/00 180/232 |
| 2010/0102595 | A1* | 4/2010 | Baumbarger | B62D 21/11 296/193.01 |
| 2012/0097466 | A1* | 4/2012 | Usami | B60K 1/04 180/68.5 |
| 2018/0118273 | A1* | 5/2018 | McConnell | B62D 21/11 |
| 2018/0194212 | A1* | 7/2018 | Hamilton | B60N 2/015 |
| 2018/0337377 | A1* | 11/2018 | Stephens | H01M 50/224 |
| 2018/0361857 | A1* | 12/2018 | Shimizu | B60L 50/64 |
| 2019/0016388 | A1* | 1/2019 | Shimizu | B60K 1/04 |
| 2019/0016391 | A1* | 1/2019 | Inoue | B62D 21/11 |
| 2019/0210651 | A1* | 7/2019 | Svacha | B62D 33/077 |
| 2020/0102014 | A1* | 4/2020 | Sakai | B62D 21/07 |
| 2020/0282788 | A1* | 9/2020 | Wolf-Monheim | B60G 13/003 |
| 2020/0317039 | A1* | 10/2020 | Chung | B60K 1/04 |
| 2020/0353982 | A1* | 11/2020 | Viereck | B62D 21/11 |
| 2021/0296728 | A1* | 9/2021 | Kim | B32B 15/14 |
| 2021/0300471 | A1* | 9/2021 | Eklund | B62D 21/11 |
| 2021/0307978 | A1* | 10/2021 | Wegner | B62D 21/11 |
| 2021/0387519 | A1* | 12/2021 | Landvik | H01M 50/244 |
| 2021/0408563 | A1* | 12/2021 | Lee | B60L 50/71 |
| 2022/0089222 | A1* | 3/2022 | Janarthanam | B62D 21/03 |
| 2022/0250485 | A1* | 8/2022 | Castleman | B60K 1/04 |
| 2022/0324527 | A1* | 10/2022 | Mast | B60L 15/20 |
| 2022/0379705 | A1* | 12/2022 | Kamei | B62D 25/2036 |
| 2022/0379706 | A1* | 12/2022 | Hiramatsu | B62D 21/11 |
| 2022/0410974 | A1* | 12/2022 | Eklund | B62D 21/03 |
| 2023/0015644 | A1* | 1/2023 | Hörder | H01M 50/296 |
| 2023/0101665 | A1* | 3/2023 | Inami | B60H 1/00557 180/68.5 |
| 2023/0103246 | A1* | 3/2023 | Inami | B62D 25/2018 296/204 |
| 2023/0143298 | A1* | 5/2023 | Kang | B62D 27/02 296/193.05 |
| 2023/0211641 | A1* | 7/2023 | Salter | B60R 16/04 280/455.1 |
| 2023/0249748 | A1* | 8/2023 | Eklund | B60G 3/14 280/124.109 |
| 2023/0264754 | A1* | 8/2023 | Yoshida | B62D 25/2045 180/65.1 |
| 2023/0311994 | A1* | 10/2023 | Zawacki | B60R 16/04 280/788 |
| 2023/0415555 | A1* | 12/2023 | Murphy | B60K 1/04 |
| 2024/0083507 | A1* | 3/2024 | Merulla | B62D 27/04 |
| 2024/0109592 | A1* | 4/2024 | Nagasawa | B62D 21/11 |
| 2024/0140188 | A1* | 5/2024 | Wikblom | B60K 1/04 |

* cited by examiner

ELECTRIC VEHICLE HAVING MOTOR SHIELD

FIELD

The present disclosure relates to a structural assembly for an electric vehicle, and more particularly, to a structural assembly that supports a motor of the electric vehicle.

BACKGROUND

The statements in this section merely provide background information related to the present disclosure and may not constitute prior art.

Electric vehicles differ from conventional motor vehicles because they are driven by one or more rechargeable battery packs having lithium-ion batteries, for example, or any other suitable electrical power storage units. In some electric vehicles, attachment structures such as cross beams and/or plates are separate from the vehicle frame and used to support one or more electric modules (e.g., electrical charger or motor) of the electric vehicle. In one example, the attachment structures may be attached to the left and right longitudinal rails of the vehicle frame and may support an electrical charger that charges the power storage units of the battery pack. Integration of the attachment structures into the structure of existing vehicles can be challenging.

The teachings of the present disclosure address these and other issues with attachment structures of electric vehicles.

SUMMARY

This section provides a general summary of the disclosure and is not a comprehensive disclosure of its full scope or all of its features.

In one form, the present disclosure provides an electric vehicle that includes a pair of opposed longitudinal outer rails, a plurality of cross beams, a pair of opposed longitudinal inner rails, at least one housing, and a plurality of bushings. The plurality of cross beams extend in a transverse direction of the vehicle and includes first and second cross beams secured to the pair of opposed longitudinal outer rails. The pair of opposed longitudinal inner rails are located inboard of the pair of opposed longitudinal outer rails and between the first and second cross beams. The pair of opposed longitudinal inner rails are secured to the first and second cross beams to form a box. The housing is connected to the box and is configured to be connected to the motor. The plurality of bushings are at least partially supported by the housing.

In variations of the electric vehicle of the above paragraph, which can be implemented individually or in any combination: the plurality of bushings include a first set of bushings and a second set of bushings, the first set of bushings has a first stiffness and the second set of bushings has a second stiffness, the first stiffness is greater than the second stiffness; each bushing of the first set of bushings has a first diameter and each bushing of the second set of bushings has a second diameter, the second diameter is greater than the first diameter; each bushing of the first set of bushings has a cylindrical shape that extends in a vertical direction, each bushing of the second set of bushings has a cylindrical shape that extends in a direction perpendicular to the vertical direction; each cross beam of the plurality of cross beams includes a plurality of reinforcement members disposed therein; further including the motor secured to the box and a motor shield connected to the motor and located further rearward than the first and second cross beams, the motor shield configured to extend further downward than the motor; mounting brackets disposed between the pair of opposed longitudinal inner rails and secured to the second cross beam and a third cross beam of the plurality of cross beams; each longitudinal inner rail of the pair of opposed longitudinal inner rails includes a plurality of reinforcement members disposed therein; the pair of opposed longitudinal inner rails are spaced apart from the opposed longitudinal outer rails; the plurality of cross beams are welded to the opposed longitudinal outer rails; the first cross beam has a trapezoidal shaped cross-section; the housing includes a plurality of housings connected to the box and configured to be connected to the motor; a plurality of first fasteners extending through respective first bushings of the first set of bushings and configured to extend through the motor to secure the respective first bushings to the motor; and a plurality of second fasteners extending through respective second bushings of the second set of bushings and the box to secure the respective second bushings to the box.

In another form, the present disclosure provides an electric vehicle that includes a vehicle body, a plurality of cross beams, a pair of opposed longitudinal inner rails, at least one housing, a first set of bushings, a plurality of first fasteners, a second set of bushings, and a plurality of second fasteners. The vehicle body includes a pair of opposed longitudinal outer rails. The plurality of cross beams extend in a transverse direction of the electric vehicle and are secured to the opposed longitudinal outer rails. Each cross beam of the plurality of cross beams includes a plurality of reinforcement members disposed therein. The pair of opposed longitudinal inner rails are located inboard of the opposed longitudinal outer rails and between two cross beams of the plurality of cross beams. The pair of opposed longitudinal inner rails are secured to the two cross beams to form a box. The housing is connected to the box and is configured to be connected to the motor. The first set of bushings are at least partially supported by the housing. The plurality of first fasteners extend through respective first bushings of the first set of bushings and are configured to extend through the motor to secure the respective first bushings to the motor. The second set of bushings are at least partially supported by the housing. The plurality of second fasteners extend through respective second bushings of the second set of bushings and the box to secure the respective second bushings to the box. The first set of bushings has a first stiffness and the second set of bushings has a second stiffness. The first stiffness is greater than the second stiffness.

In variations of the electric vehicle of the above paragraph, which can be implemented individually or in any combination: each bushing of the first set of bushings has a first diameter and each bushing of the second set of bushings has a second diameter, the second diameter is greater than the first diameter; each bushing of the first set of bushings has a cylindrical shape that extends in a vertical direction, each bushing of the second set of bushings has a cylindrical shape that extends in a direction perpendicular to the vertical direction; each longitudinal inner rail of the pair of opposed longitudinal inner rails includes a plurality of reinforcement members disposed therein; the plurality of cross beams are welded to the opposed longitudinal outer rails; and the pair of opposed longitudinal inner rails are spaced apart from the opposed longitudinal outer rails.

In another form, the present disclosure provides an electric vehicle that includes a vehicle body, a plurality of cross beams, a pair of opposed longitudinal inner rails, at least one housing, a first set of bushings, a plurality of first fasteners, a second set of bushings, and a plurality of second fasteners. The vehicle body includes a pair of opposed longitudinal outer rails. The plurality of cross beams extend in a transverse direction of the electric vehicle and are secured to the pair of opposed longitudinal outer rails. Each cross beam of the plurality of cross beams includes a plurality of reinforcement members disposed therein. The pair of opposed longitudinal inner rails are located inboard of the opposed longitudinal outer rails and between two cross beams of the plurality of cross beams. The pair of opposed longitudinal inner rails are secured to the two cross beams to form a box. Each longitudinal inner rail of the pair of opposed longitudinal inner rails includes a plurality of reinforcement members disposed therein. The housing is connected to the box and is configured to be connected to the motor. The first set of bushings at least partially supported by the housing. The plurality of first fasteners extending through respective first bushings of the first set of bushings and configured to extend through the motor to secure the respective first bushings to the motor. The second set of bushings at least partially supported by the housing. The plurality of second fasteners extending through respective second bushings of the second set of bushings and the box to secure the respective second bushings to the box. The first set of bushings has a first stiffness and the second set of bushings has a second stiffness. The first stiffness is greater than the second stiffness. Each bushing of the first set of bushings has a cylindrical shape that extends in a vertical direction. Each bushing of the second set of bushings has a cylindrical shape that extends in a direction perpendicular to the vertical direction.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
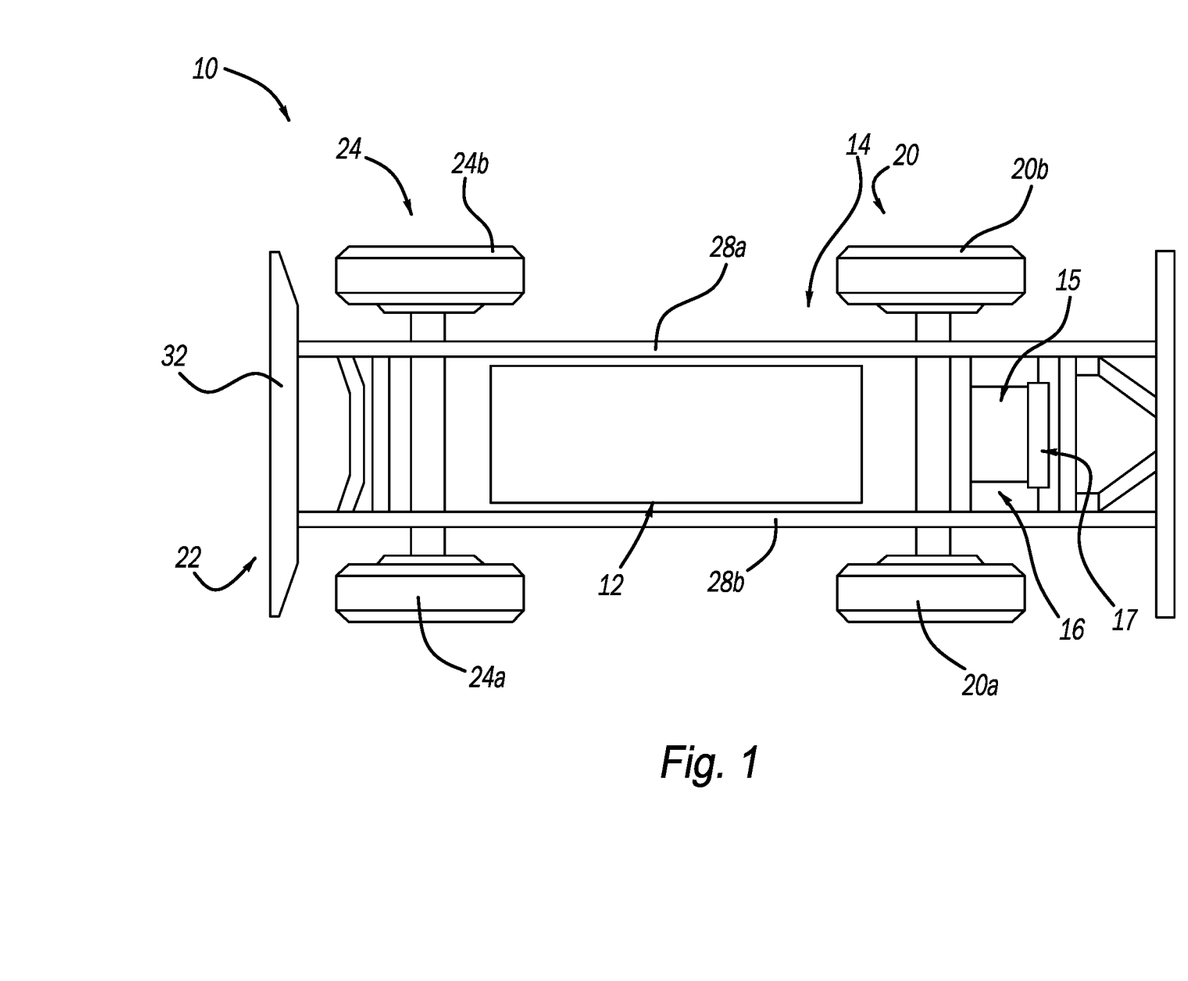
FIG. 1 is a schematic view of a vehicle including a structural assembly according to the principles of the present disclosure.
Figure 2:
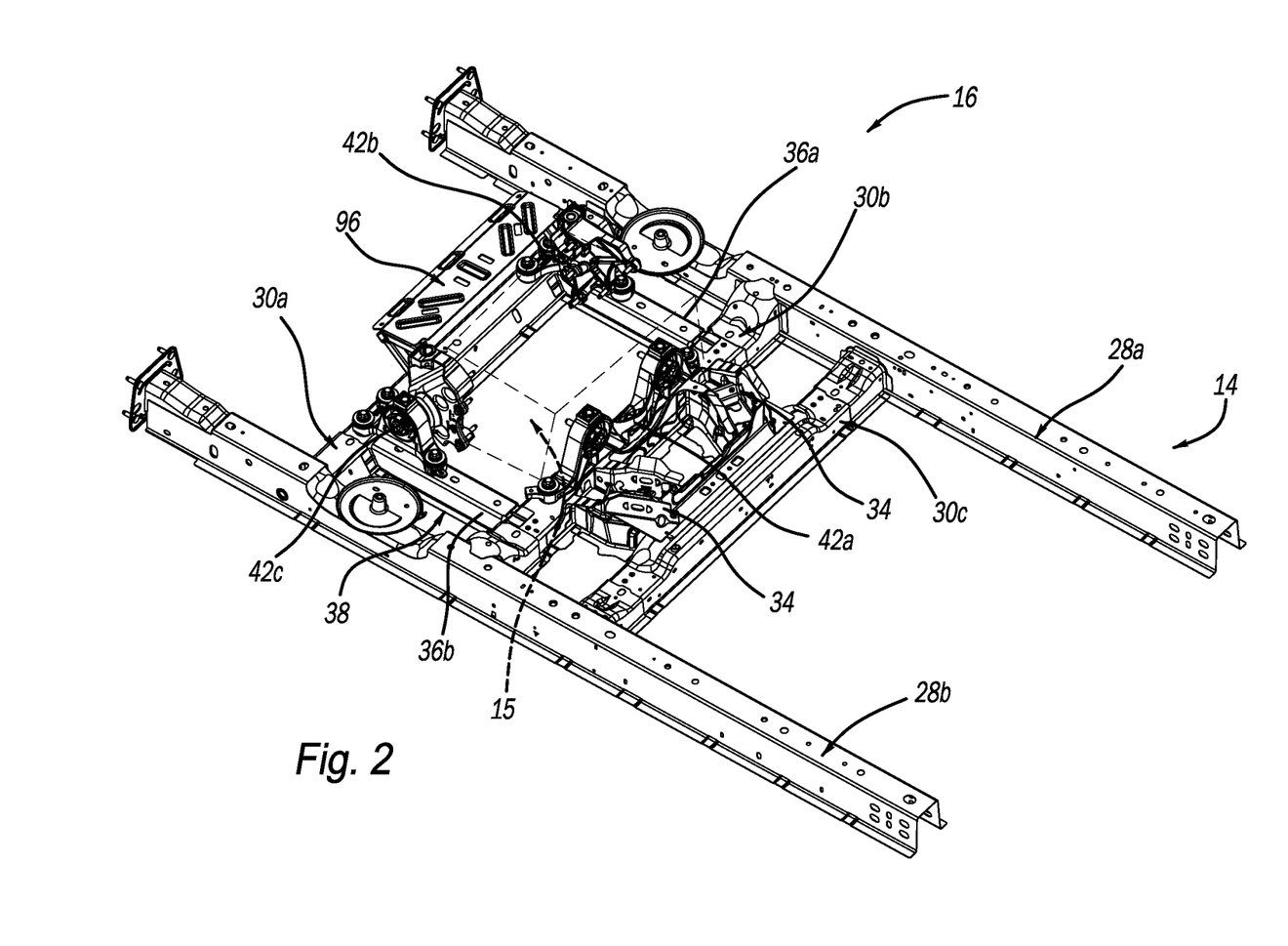
FIG. 2 is a perspective bottom view of a portion of a vehicle frame of the vehicle of FIG. 1.

With reference to FIG. 1, a vehicle 10 such as an electric vehicle is provided. In the example provided, the electric vehicle is a battery electric vehicle (BEV). In other examples, the electric vehicle may be a hybrid electric vehicle (HEV), a plug-in electric vehicle (PHEV), or a fuel cell vehicle, among others. The vehicle 10 includes a battery pack or battery structure 12, a vehicle frame 14, and a structural assembly 16. The battery pack 12 may be rechargeable and may include lithium-ion batteries or any other suitable electrical power storage units. The battery pack 12 may be disposed at various locations of the vehicle 10 and may be mounted to the vehicle frame 14. In this way, the battery pack 12 is supported by the vehicle frame 14 and is remote from a passenger cabin (not shown) and cargo compartments (not shown) of the vehicle 10, therefore, not occupying space that would otherwise be available for passengers or cargo. The battery pack 12 powers a motor 15 to drive a set of wheels 20a, 20b. In the example provided the wheels 20a, 20b are rear wheels and the motor 15 is also referred to as the rear motor 15, though other configurations can be used. Similarly, the battery pack 12 can power a second motor (not shown) to selectively drive a different set of wheels 24a, 24b. In the example provided, the wheels 24a, 24b are front wheels, though other configurations can be used. In some forms, the battery pack 12 includes an outer support frame (not specifically shown) and a pair of battery cage longitudinal members (not specifically shown). The pair of battery cage longitudinal members extend along opposing sides of the outer support frame and are secured to the outer support frame and the vehicle frame 14.

With reference to FIGS. 2-5, the vehicle frame 14 is made of a metal material such as steel, for example, and is the main supporting structure of the vehicle 10, to which various components are attached either directly or indirectly. The vehicle frame 14 includes a front end 22 (FIG. 1), a pair of rockers or longitudinal outer rails 28a, 28b and crossmembers or cross beams 30a, 30b, 30c. The front end 22 includes, inter alia, a bumper 32 that extends in a transverse direction relative to a longitudinal direction X of the vehicle 10. The pair of longitudinal outer rails 28a, 28b are spaced apart from each other. In some forms, the pair of longitudinal outer rails 28a, 28b are spaced apart from the outer support frame, for example, of the battery structure 12. In this way, components such as electrical conduits (not shown), for example, may extend along and between the outer support frame of the battery structure 12 and the pair of outer rails 28a, 28b.

Each outer rail 28a, 28b is elongated and extends along the longitudinal direction X of the vehicle 10. In some forms, the outer rail 28a, 28b is secured to a respective battery cage longitudinal member with mechanical fasteners. The outer rail 28a, 28b may include a cavity having one or more compression tubes or compression limiters 29 (FIG. 3) disposed therein. The compression tubes 29 inhibit the longitudinal rail 28a, 28b from deforming. Additionally, or alternatively, each outer rail 28a, 28b may include other reinforcement structures (not shown) disposed within and secured to the outer rail 28a, 28b to further provide reinforcement to the outer rail 28a, 28b.

Figure 6:
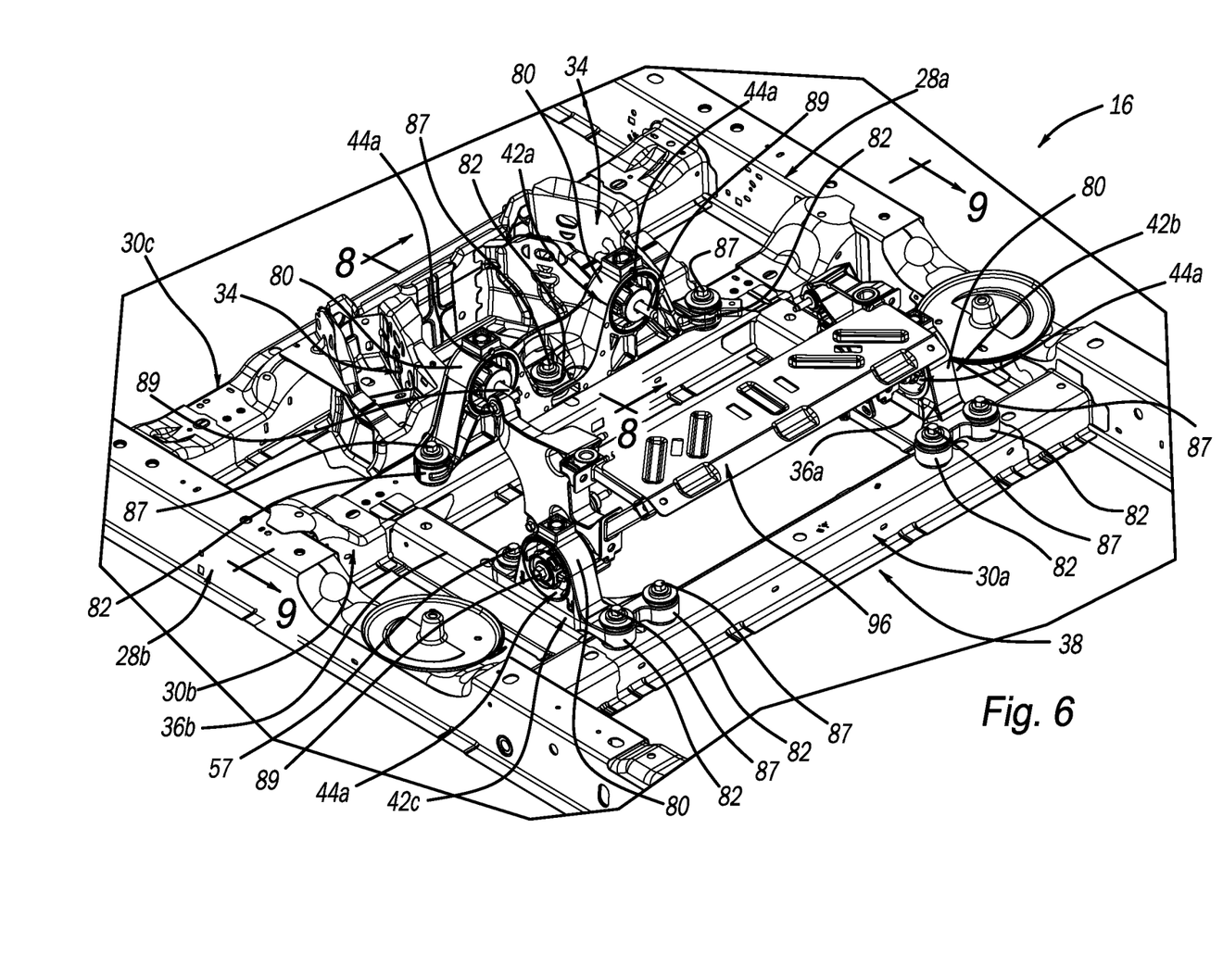
FIG. 6 is a perspective view of a portion of the structural assembly of FIG. 1.
Figure 7:
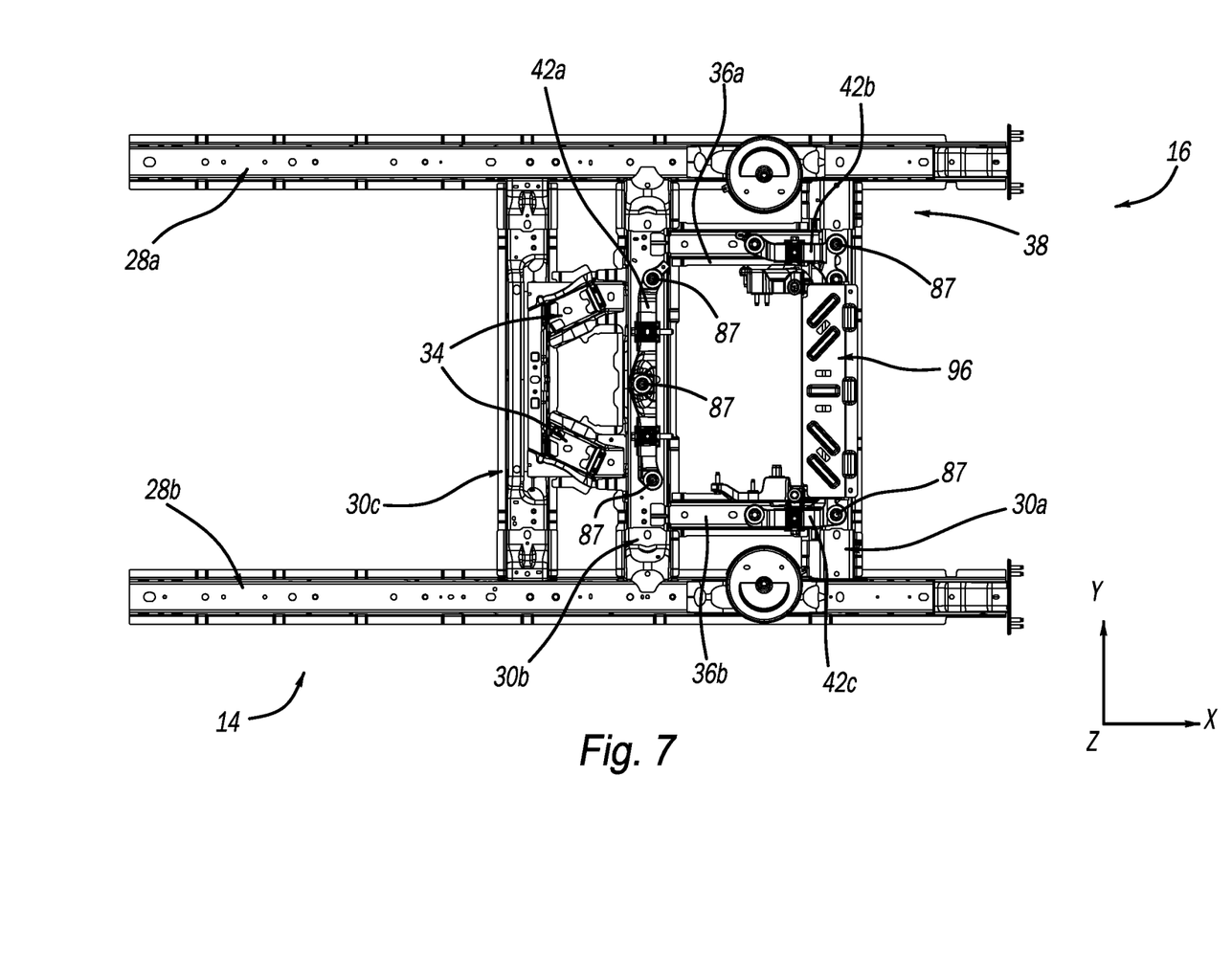
FIG. 7 is a bottom view of the structural assembly of FIG. 1.

With additional reference to FIGS. 6 and 7, the cross members 30a, 30b, 30c are structural members that extend in a transverse direction Y relative to the longitudinal direction X of the vehicle 10 and connect the outer rails 28a, 28b to each other. The cross members 30a, 30b, 30c are spaced apart from each other along the longitudinal direction X of the vehicle 10. The cross members 30a, 30b are secured to the outer rails 28a, 28b, thereby forming a box structure 38 that supports the rear motor 15. In some forms, two adjacent cross beams located near a front of the vehicle 10 (i.e., located further toward the front of the vehicle 10 than the battery pack 12) and secured to the outer rails 28a, 28b at the front of the vehicle 10 may form a box structure that supports the front motor (not shown).

Figure 8A:
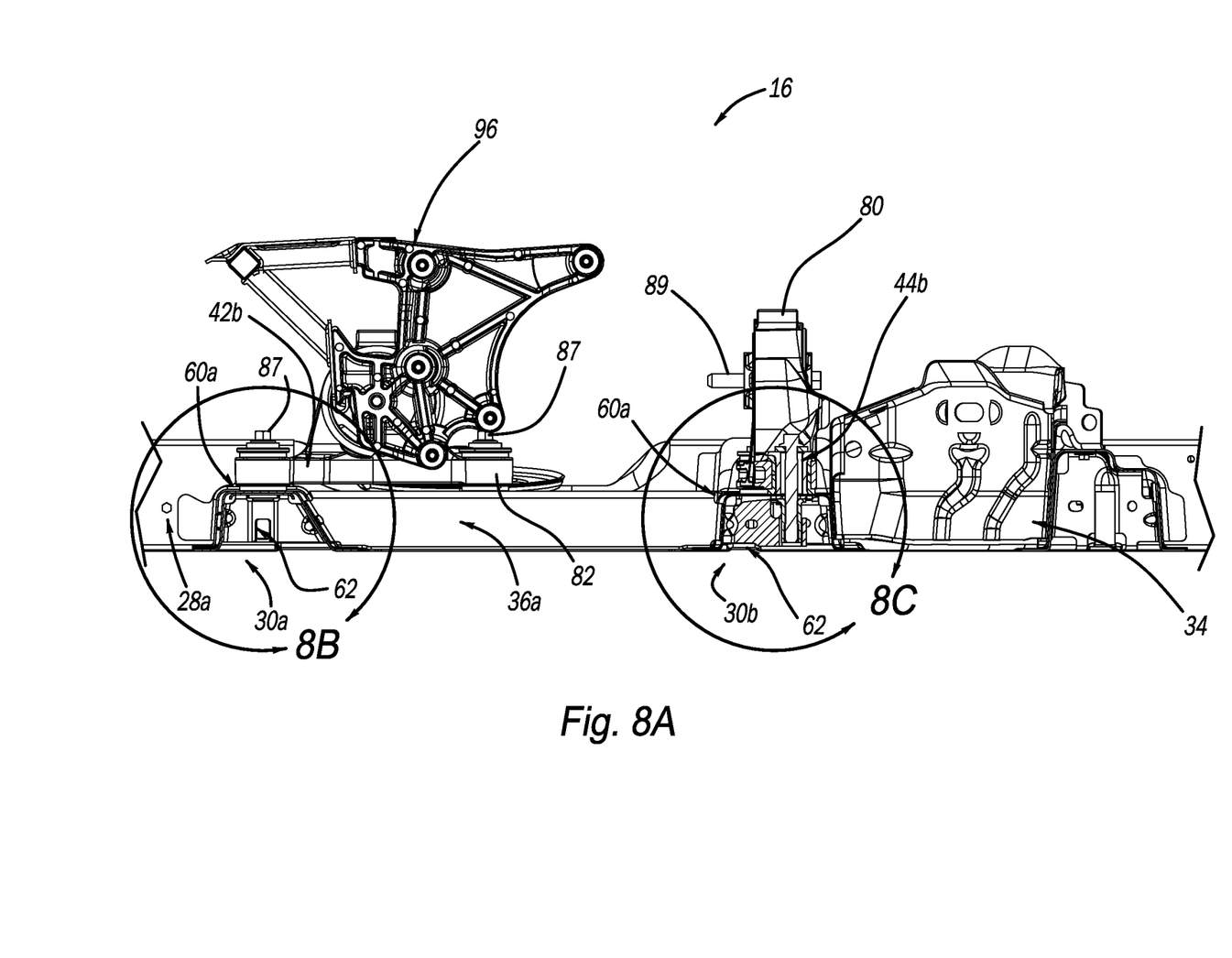
FIG. 8A is a cross-sectional view of the structural assembly of FIG. 1 taken along line 8-8 of FIG. 6.
Figure 8B:
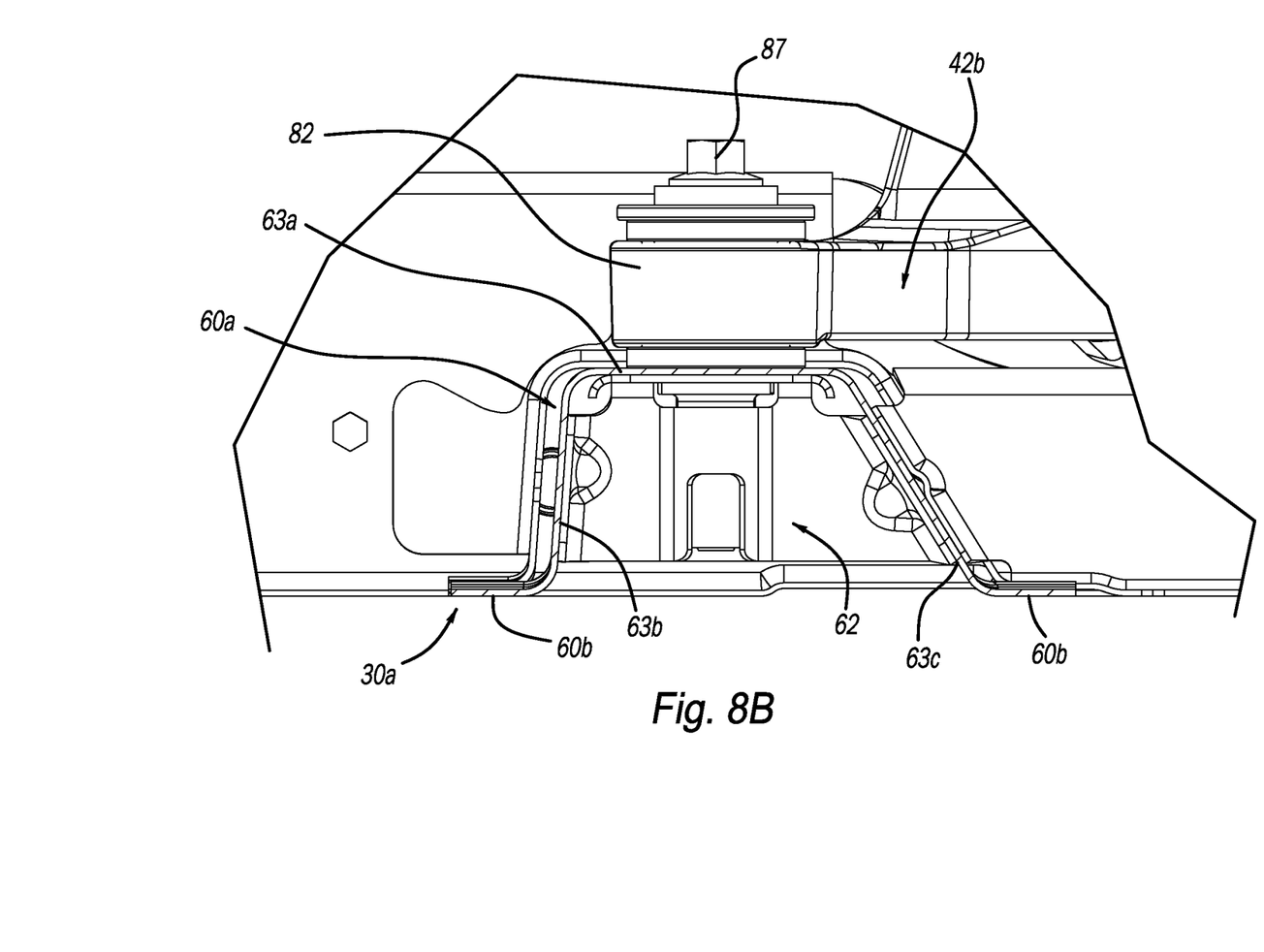
FIG. 8B is a cross-sectional view of area 8B in FIG. 8A.
Figure 8C:
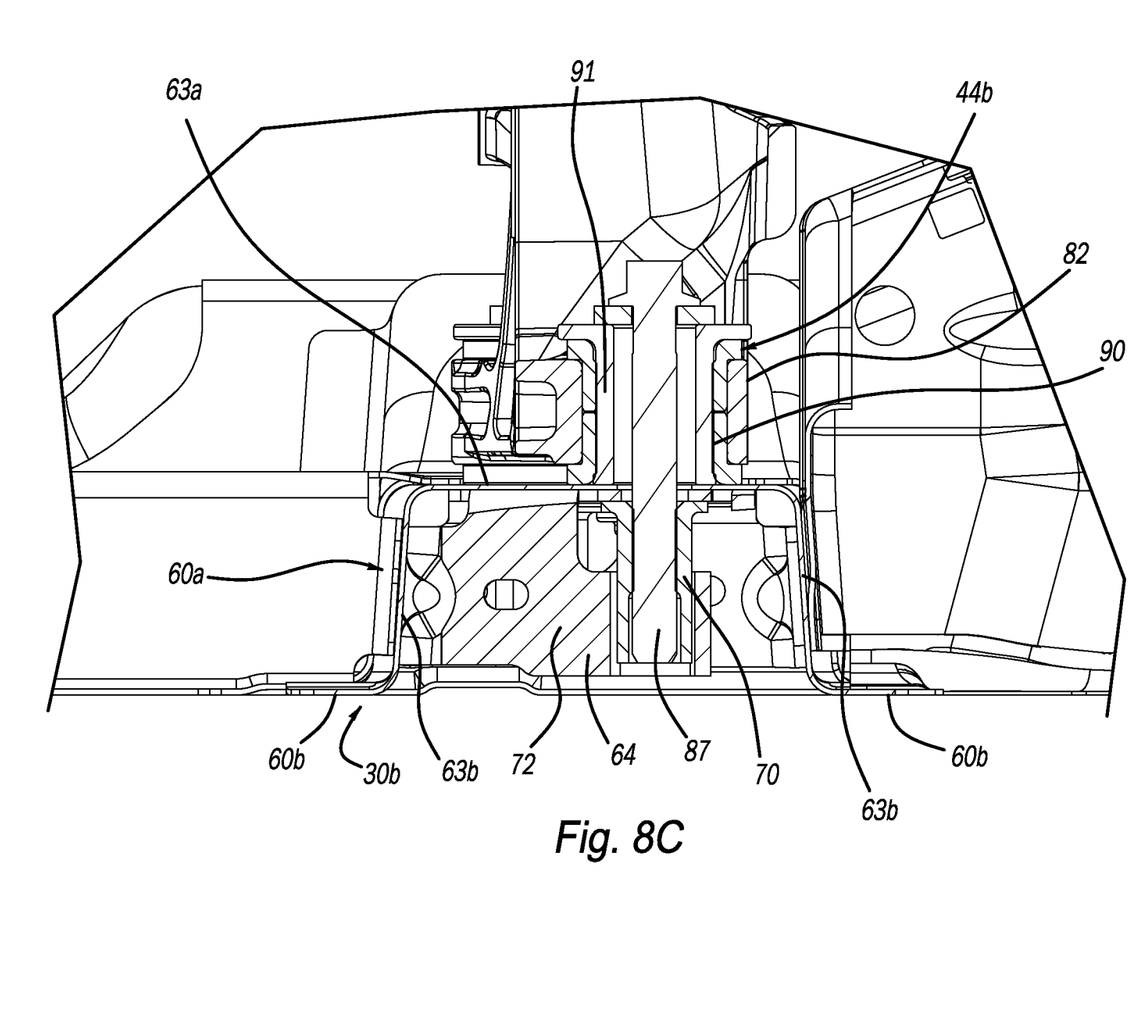
FIG. 8C is a cross-sectional view of area 8C in FIG. 8A.

As shown in FIG. 8A-8C, each cross member 30a, 30b, 30c has a U-shape cross-section, V-shape cross-section, or trapezoidal shape cross-section, for example, and includes a body 60a and a pair of outer flanges 60b extending from the body 60a. The body 60a defines a channel 62 where one or more reinforcement members 64 (FIGS. 3 and 8) are located to reinforce the cross member 30a, 30b, 30c. In the example illustrated, at least a portion of the reinforcement members 64 are secured to the body 60a via welding, for example. That is, each reinforcement member 64 includes a cylindrical sleeve 70 and a plurality of flaps 72 extending from the sleeve 70 and fixed (e.g., welded) to a pair of vertical walls 63b and/or a horizontal wall 63a of the body 60a of the cross members 30a, 30c. The sleeve 70 is threadably engaged with a fastener 87 and rotatably supports the fastener 87.

In the example illustrated, the body 60a of the cross beams 30b, 30c includes a pair of vertical walls 63b and the horizontal wall 63, thus, giving the cross beams 30b, 30c a generally rectangular shape (albeit open-bottomed) cross-section. In the example illustrated, the body 60a of the cross beam 30a includes one vertical wall 63b, the horizontal wall 63a, and one oblique wall 63c (i.e., slanted relative to the vertical wall 63b), thus, giving the cross beam 30a a generally trapezoidal shape (albeit open-bottomed) cross-section. The cross-section of the beams 30a, 30b, and 30c is also commonly referred to as hat-shaped. The cross beam 30a including the trapezoidal shape cross-section enhances the stiffness of the cross beam 30a. Although cross beam 30a is shown and described as having a trapezoidal shape cross-section, it should be understood that, in some forms, the cross beams 30b, 30c may also include a trapezoidal shape cross-section without departing from the principles of the present disclosure. As used herein, the terms "vertical walls" and "horizontal walls" refer to these walls being substantially vertical and substantially horizontal relative to the XYZ coordinate system shown in FIG. 7, in which horizontal is parallel to the XY plane and the Z axis corresponds to the vertical direction. "Substantially vertical," and "substantially horizontal," as used herein to refer to the vertical and horizontal walls means that these walls may be not perfectly or entirely vertical or horizontal.

The body 60a of each cross member 30a, 30b, 30c includes the lower flat, horizontal wall 63a that includes a plurality of apertures 66 (FIG. 4) extending therethrough. The apertures 66 may have an oblong or circular shape. The fastener 87 extends vertically through a respective aperture 66, the sleeve 70 of a respective reinforcement member 64, a respective second bushing 44b of a set of second bushings 44b, and a respective housing 42a, 42b, 42c, thereby securing the respective reinforcement member 64, the box structure 38, the respective second bushing 44b, and the respective housing 42a, 42b, 42c to each other. In some forms, the apertures 66 may have a rectangular shape or another suitable shape configured to receive fastener 87. The flanges 60b may be secured to a vehicle floor (not shown), thereby securing the structural assembly 16 to the vehicle floor.

Mounting brackets 34 are disposed between a pair of opposed longitudinal inner rails 36a, 36b and extend generally in a longitudinal direction of the vehicle 10. In some forms, an end portion of each mounting bracket 34 may angle inwardly toward a center of the vehicle 10. In the example illustrated, the mounting brackets 34 are secured to the cross beams 30b, 30c. In some forms, the mounting brackets 34 are secured to the cross beams 30b, 30c using mechanical fasteners or any other suitable attachment means such as welding, for example. In the example illustrated, a suspension system (not shown) is secured to the vehicle frame 14 via the mounting brackets 34 and secures the wheels 20a, 20b of the vehicle 10 to the vehicle frame 14. The suspension system provides a smooth ride by absorbing energy from various road bumps while driving. The suspension system includes various components such as upper and lower control arms, shock absorbers, and ball joints, for example. It should be understood that the vehicle 10 of the present disclosure can be of a uni-body architecture or a body-on-frame architecture without departing from the principles disclosed herein.

With reference to FIGS. 4-7, the structural assembly 16 is positioned adjacent the battery pack 12 and supports one or more components of the vehicle 10 such as the rear motor 15, for example. In this way, a separate subframe mounted to the vehicle frame 14 and supporting one or more components of the vehicle such as the rear motor 15 can be omitted, thus, reducing the weight of the vehicle 10. The structural assembly 16 includes the pair of longitudinal outer rails 28a, 28b, the cross beams 30a, 30b, 30c, the pair of opposed longitudinal inner rails 36a, 36b, a plurality of housings 42a, 42b, 42c, a first set of bushings 44a, and the second set of bushings 44b. The pair of longitudinal inner rails 36a, 36b are located inboard of the pair of opposed longitudinal outer rails 28a, 28b and are spaced apart from the pair of longitudinal outer rails 28a, 28b. The pair of opposed longitudinal inner rails 36a, 36b are located between the cross members 30a, 30b and are welded to the cross members 30a, 30b. In some forms, the pair of opposed longitudinal inner rails 36a, 36b are secured to the cross members 30a, 30b using mechanical fasteners such as bolts, screws, or rivets, or using any other suitable attachment means. The pair of opposed longitudinal inner rails 36a, 36b have a length that is shorter than a length of the cross beams 30a, 30b, 30c and shorter than a length of the pair of longitudinal outer rails 28a, 28b.

Figure 3:
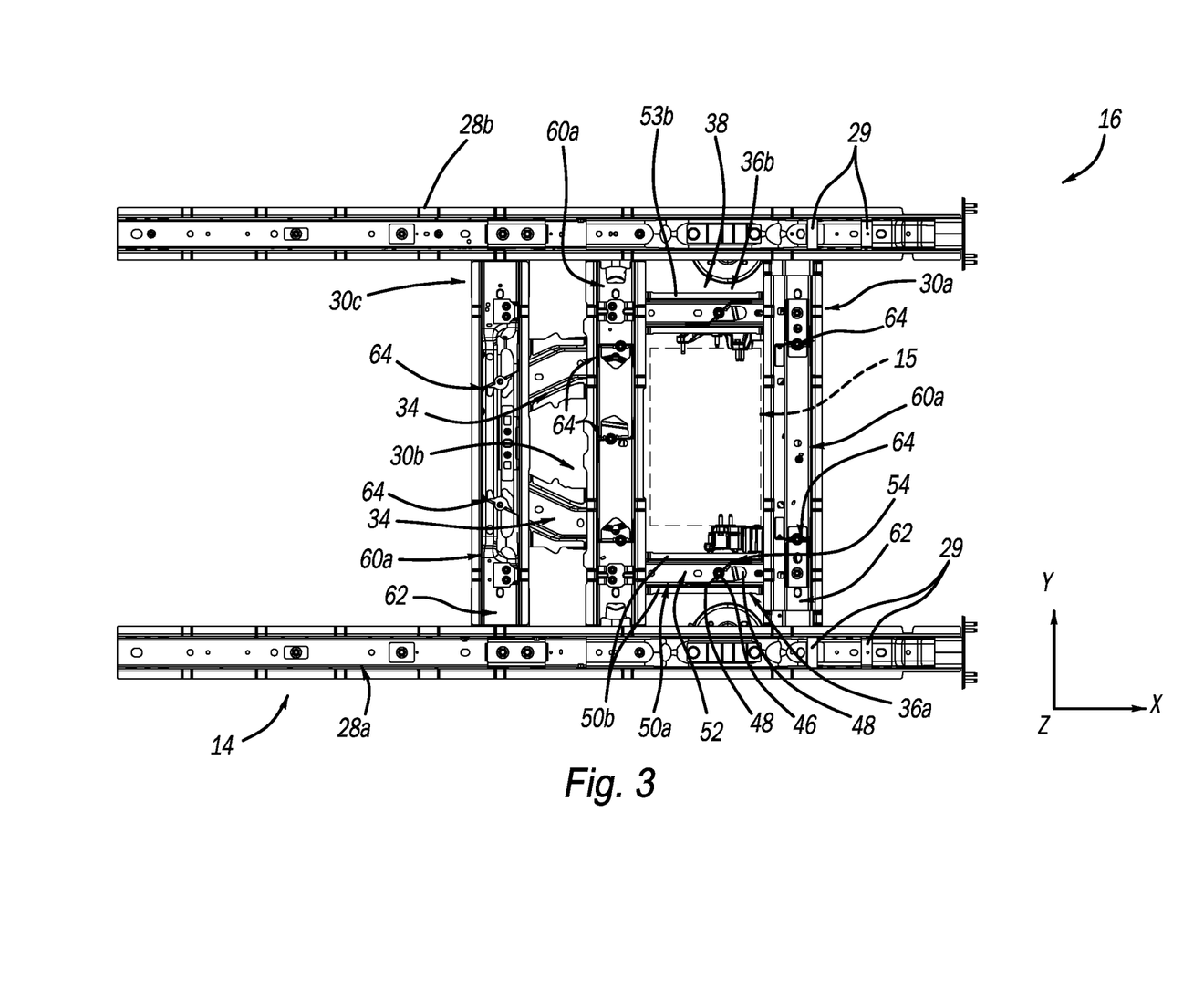
FIG. 3 is a top view of a portion of the vehicle frame of the vehicle of FIG. 1.
Figure 4:
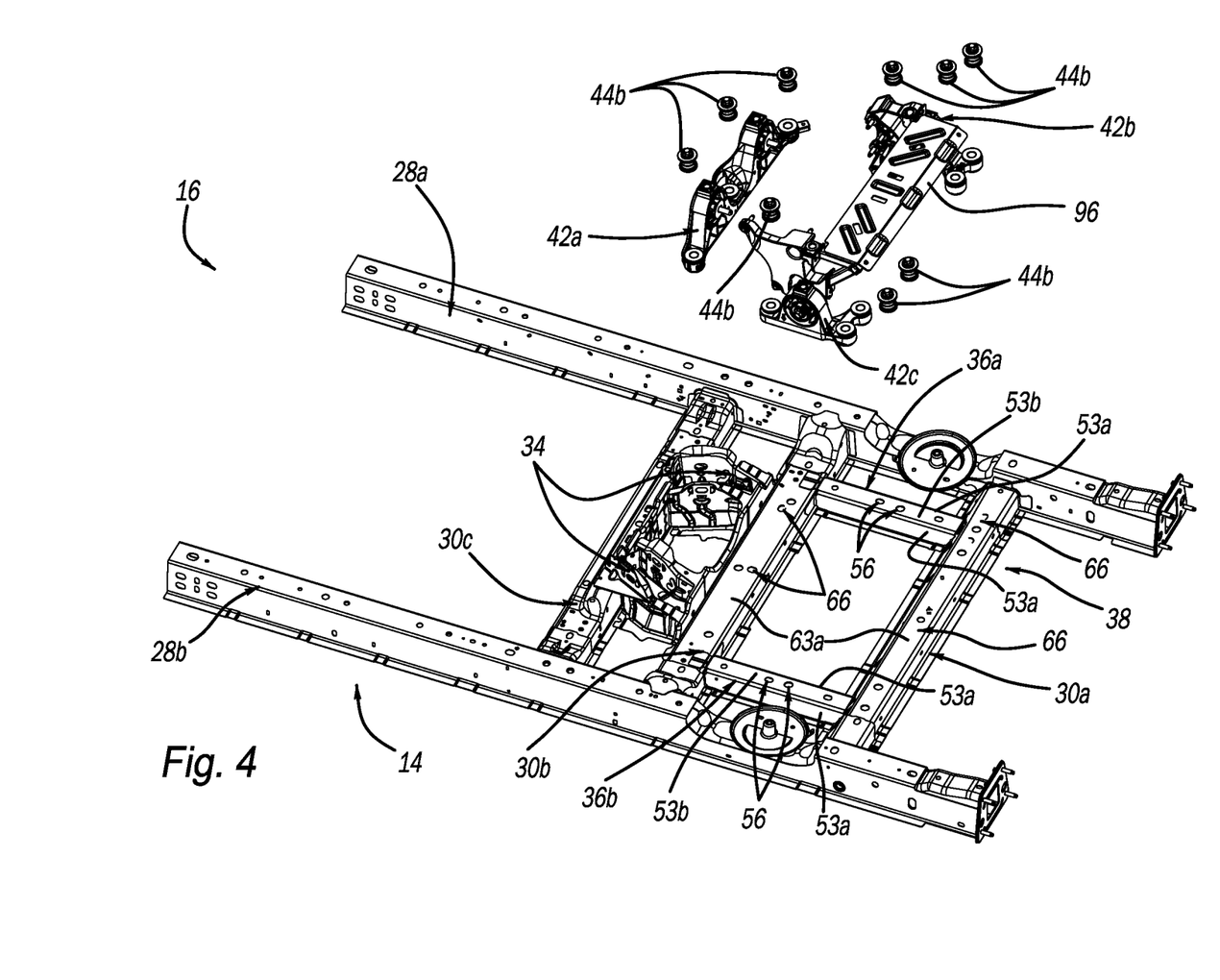
FIG. 4 is an exploded top perspective view of the structural assembly of FIG. 1.
Figure 5:
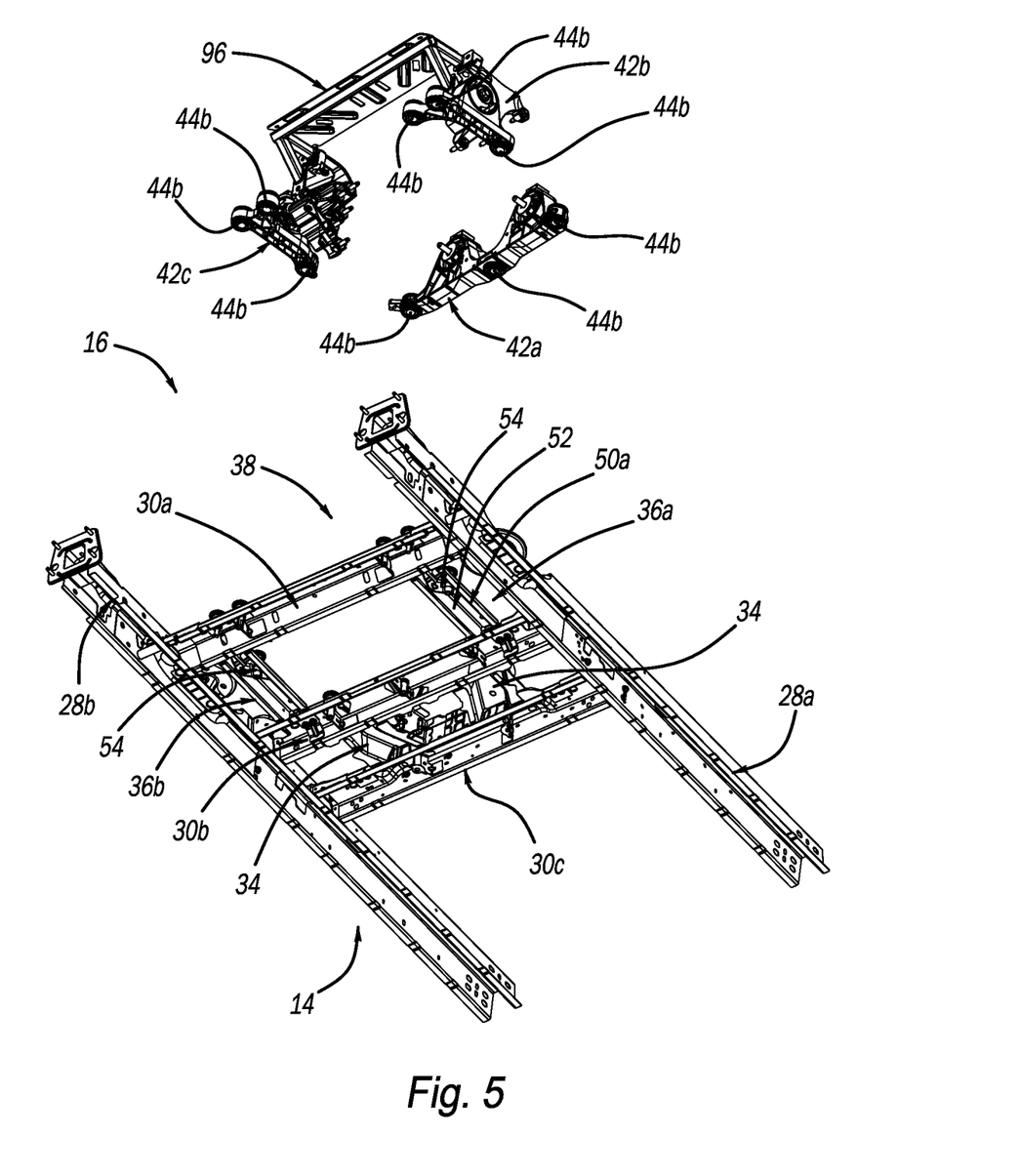
FIG. 5 is an exploded bottom perspective view of the structural assembly of FIG. 1.

With reference to FIGS. 3 and 5, each inner rail 36a, 36b has a U-shape cross-section or V-shape cross-section, for example, and includes a body 50a and a pair of outer flanges 50b extending from the body 50a. The body 50a defines a channel 52 where one or more reinforcement members 54 are located to reinforce the inner rail 36a, 36b. In the example illustrated, at least a portion of the reinforcement members 54 are secured to the body 50a via welding, for example. That is, each reinforcement member 54 includes a cylindrical sleeve 46 and a plurality of flaps 48 extending from the sleeve 46 and fixed (e.g., welded) to vertical walls 53a and/or a horizontal wall 53b of the body 50a. The sleeve 46 is threadably engaged with a fastener 57 (FIG. 6) and rotatably supports the fastener 57.

The body 50a includes the lower flat, horizontal surface 53b that includes a plurality of apertures 56 (FIG. 4) extending therethrough. The apertures 56 may have an oblong or circular shape. The fastener 57 extends vertically through a respective aperture 56, the sleeve 46 of a respective reinforcement member 54, a respective second bushing 44b and a respective housing 42b, 42c, thereby securing the respective reinforcement member 54, the inner rail 36a, 36b, the respective second bushing 44b and the respective housing 42b, 42c to each other. In some forms, the apertures 56 may have a rectangular shape or another suitable shape configured to receive fastener 57. The pair of outer flanges 50b may be secured to the vehicle floor (not shown), thereby securing the structural assembly 16 to the vehicle floor.

Figure 9:
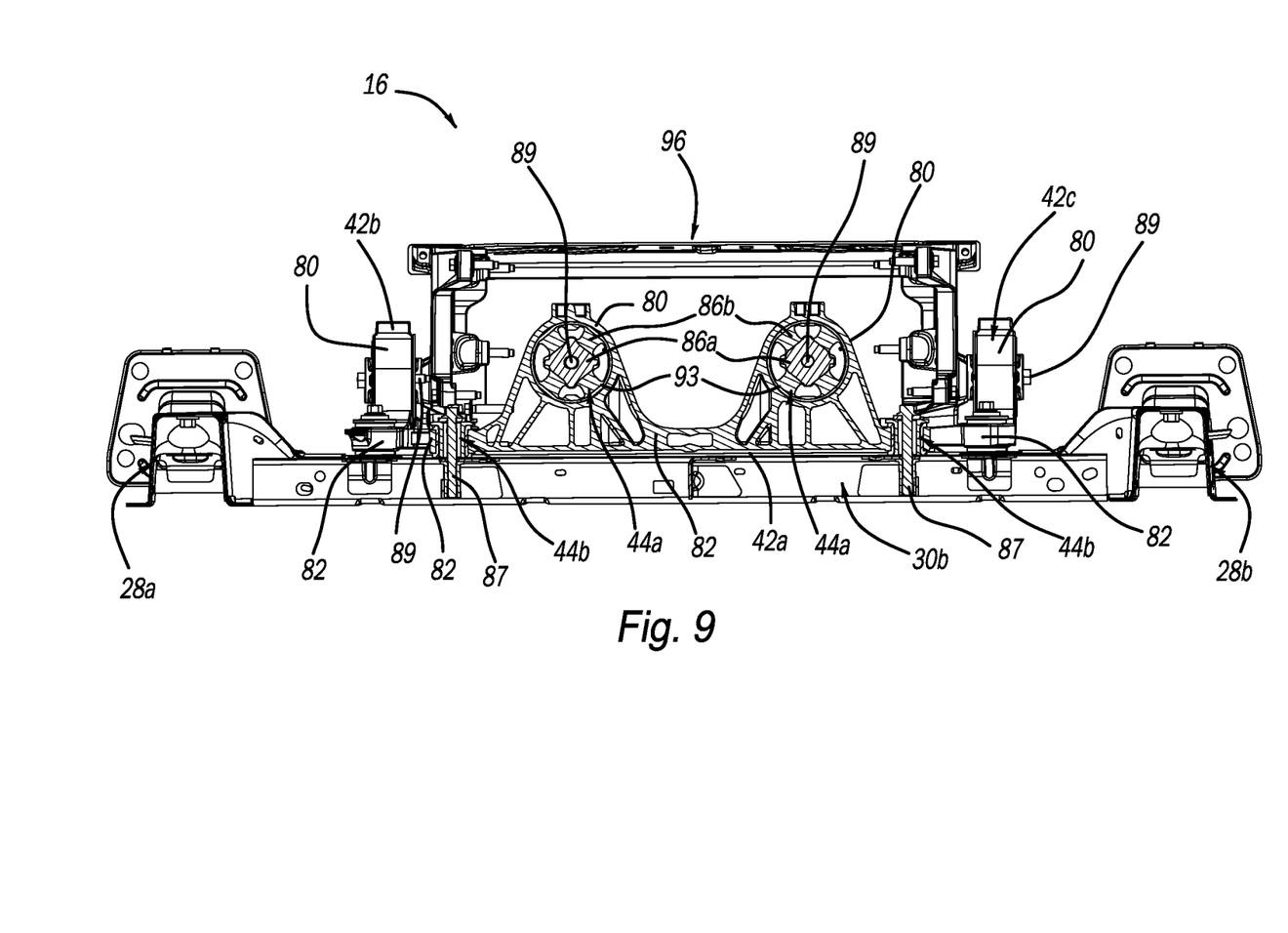
FIG. 9 is a cross-sectional view of the structural assembly of FIG. 1 taken along line 9-9 of FIG. 6.

With reference to FIGS. 6, 8, and 9, each housing 42a, 42b, 42c is made of a metal material such as aluminum or steel, for example, and is mounted to the box structure 38. That is, the housing 42a is mounted to the cross beam 30b of the box structure 38, the housing 42b is mounted to the cross beam 30a and the inner rail 36a of the box structure 38, and the housing 42c is mounted to the cross beam 30a and the inner rail 36b of the box structure 38. Each housing 42a, 42b, 42c includes one or more cylindrical portions 80 and a plurality of flanges 82. Each cylindrical portion 80 is located between two flanges 82 and defines an opening.

The first set of bushings 44a are disposed in respective housings 42a, 42b, 42c and have a stiffness that is less than a stiffness of the second set of bushings 44b. Each bushing 44a of the first set of bushings 44a has a cylindrical shape and extends in a direction perpendicular to the vertical direction Z. In some forms, one or more bushings 44a extend in the longitudinal direction X of the vehicle 10 and one or more bushings 44a extend in a lateral direction Y of the vehicle 10. In some forms, each busing 44a may extend in the vertical direction Z and each bushing 44b may extend perpendicular to the vertical direction Z. Each bushing 44a of the first set of bushings 44a has a diameter that is greater than a diameter of the second set bushings 44b.

Each bushing 44a is press-fit within the opening of the cylindrical portion 80 of the respective housing 42a, 42b, 42c. Each bushing 44a includes an inner sleeve 86a, an elastic body 86b and an outer sleeve 93. The inner sleeve 86a is cylindrical shape and is made of a metal material. The inner sleeve is attached to (e.g., press-fitted) the elastic body 86b and defines an opening extending therethrough.

The elastic body 86b may be bonded to and molded into the outer sleeve and may be a cylindrical shape. The elastic body 86b is also disposed between the inner sleeve 86a and the outer sleeve 93. The elastic body 86b deforms elastically when a force is applied to the elastic body 86b and returns to its original shape once the force is removed from the elastic body 86b. In the example provided, the elastic body 86b is made of an elastomeric material such as polyurethane, silicones, or a rubber, for example. In the example illustrated, the elastic body 86b is made of a pattern and/or profile that is different than that of the elastic body 90 of the bushing 44b. That is, in the example illustrated, the elastic body 86b may include grooves and/or depressions and not have a constant/uniform cross-sectional area. In some forms, the elastic body 86b includes a constant/uniform cross-sectional area.

The outer sleeve 93 may be press-fit onto the elastic body 86b such that the outer sleeve 93 houses the elastic body 86b and the inner sleeve 86a. The outer sleeve 93 is also attached to the respective housing 42a, 42b, 42c. For example, the outer sleeve 93 may be press-fit into the central opening of the cylindrical portion 80 of the respective housing 42a, 42b, 42c. Fasteners 89 extending horizontally through respective bushings 44a of the first set of bushings 44a in the housing 42a also extends through the rear motor 15, thereby securing the housing 42a and the rear motor 15 to each other. Fasteners 89 extending horizontally through respective bushings 44a of the first set of bushings 44a in the housing 42b, 42c also extends at least partially through the motor shield assembly 96 to secure the housing 42b, 42c and the motor shield assembly 96 to each other. The fastener 89 may be a screw or a bolt, for example.

Each bushing 44b is press-fit within an opening of a respective flange 82 of the housing 42a, 42b, 42c. Each bushing 44b also has a cylindrical shape that extends in the vertical direction Z. With reference to FIGS. 8A and 8C, each bushing 44b is mechanically coupled to the box structure 38 and includes an inner sleeve 91 and an elastic body 90. The inner sleeve 91 is cylindrical shape and is made of a metal material. The inner sleeve 91 is attached to (e.g., press-fitted) the elastic body 90 and defines an opening extending therethrough.

The elastic body 90 may be bonded to and molded into the inner sleeve 91 and may be a cylindrical shape. The elastic body 90 is also disposed between the inner sleeve 91 and the respective flange 82. The elastic body 90 deforms elastically when a force is applied to the elastic body 90 and returns to its original shape once the force is removed from the elastic body 90. In the example provided, the elastic body 90 is made of an elastomeric material such as polyurethane, silicones, or a rubber, for example, that is stiffer than the elastomeric material of the elastic body 86b. The elastic body 90 has a diameter that is smaller than a diameter of the elastic body 86b. The elastic body 90 may also have a stiffness that is greater than a stiffness of the elastic body 86b. In some forms, the elastic body 86b of the bushings 44a is stiffer than the elastic body 90 of the bushings 44b. In some forms, the elastic body 86b has a diameter that is smaller than the diameter of the elastic body 90.

The optional motor shield assembly 96 may be secured to the rear motor 15 and may configured to protect debris and other objects from the rear motor 15. The motor shield 96 may be located further rearward than the cross beams 30a, 30b, 30c and may extend further downward than the rear motor 15 and the structural assembly 16. One example of such a motor shield is disclosed in U.S. patent application Ser. No. 18/366,416, filed on the same day as the present application, and titled "ELECTRIC VEHICLE HAVING MOTOR SHIELD," which is commonly owned with the present application and the contents of which are incorporated herein by reference in its entirety.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An electric vehicle comprising:
   a pair of opposed longitudinal outer rails;
   a plurality of cross beams extending in a transverse direction of the vehicle and including first and second cross beams secured to the pair of opposed longitudinal outer rails;
   a pair of opposed longitudinal inner rails located inboard of the pair of opposed longitudinal outer rails and between the first and second cross beams, the pair of opposed longitudinal inner rails secured to the first and second cross beams to form a box;
   at least one housing connected to the box and configured to be connected to a motor of the electric vehicle; and
   a plurality of bushings at least partially supported by the at least one housing.

2. The electric vehicle of claim 1, wherein the plurality of bushings include a first set of bushings and a second set of bushings, and wherein the first set of bushings has a first stiffness and the second set of bushings has a second stiffness, the first stiffness is greater than the second stiffness.

3. The electric vehicle of claim 2, wherein each bushing of the first set of bushings has a first diameter and each bushing of the second set of bushings has a second diameter, the second diameter is greater than the first diameter.

4. The electric vehicle of claim 2, wherein each bushing of the first set of bushings has a cylindrical shape that extends in a vertical direction, and wherein each bushing of the second set of bushings has a cylindrical shape that extends in a direction perpendicular to the vertical direction.

5. The electric vehicle of claim 2, further comprising:
   a plurality of first fasteners extending through respective first bushings of the first set of bushings and configured to extend through the motor to secure the respective first bushings to the motor; and
   a plurality of second fasteners extending through respective second bushings of the second set of bushings and the box to secure the respective second bushings to the box.

6. The electric vehicle of claim 1, wherein each cross beam of the plurality of cross beams includes a plurality of reinforcement members disposed therein.

7. The electric vehicle of claim 1, further comprising:
   the motor secured to the box structure;
   a motor shield connected to the motor and located further rearward than the first and second cross beams, the motor shield configured to extend further downward than the motor.

8. The electric vehicle of claim 1, further comprising mounting brackets disposed between the pair of opposed longitudinal inner rails and secured to the second cross beam and a third cross beam of the plurality of cross beams.

9. The electric vehicle of claim 1, wherein each longitudinal inner rail of the pair of opposed longitudinal inner rails includes a plurality of reinforcement members disposed therein.

10. The electric vehicle of claim 1, wherein the pair of opposed longitudinal inner rails are spaced apart from the opposed longitudinal outer rails.

11. The electric vehicle of claim 1, wherein the plurality of cross beams are welded to the opposed longitudinal outer rails.

12. The electric vehicle of claim 1, wherein the first cross beam has a trapezoidal shaped cross-section.

13. The electric vehicle of claim 1, wherein the at least one housing includes a plurality of housings connected to the box and configured to be connected to the motor.

14. An electric vehicle comprising:
   a vehicle body including a pair of opposed longitudinal outer rails;
   a plurality of cross beams extending in a transverse direction of the electric vehicle and secured to the opposed longitudinal outer rails, each cross beam of the plurality of cross beams includes a plurality of reinforcement members disposed therein;
   a pair of opposed longitudinal inner rails located inboard of the opposed longitudinal outer rails and between two cross beams of the plurality of cross beams, the pair of opposed longitudinal inner rails secured to the two cross beams to form a box;
   at least one housing connected to the box and configured to be connected to a motor of the electric vehicle;
   a first set of bushings at least partially supported by the at least one housing;
   a plurality of first fasteners extending through respective first bushings of the first set of bushings and configured to extend through the motor to secure the respective first bushings to the motor;
   a second set of bushings at least partially supported by the at least one housing; and
   a plurality of second fasteners extending through respective second bushings of the second set of bushings and the box to secure the respective second bushings to the box,
     wherein the first set of bushings has a first stiffness and the second set of bushings has a second stiffness, the first stiffness is greater than the second stiffness.

15. The electric vehicle of claim 14, wherein each bushing of the first set of bushings has a first diameter and each bushing of the second set of bushings has a second diameter, the second diameter is greater than the first diameter.

16. The electric vehicle of claim 14, wherein each bushing of the first set of bushings has a cylindrical shape that extends in a vertical direction, and wherein each bushing of the second set of bushings has a cylindrical shape that extends in a direction perpendicular to the vertical direction.

17. The electric vehicle of claim 14, wherein each longitudinal inner rail of the pair of opposed longitudinal inner rails includes a plurality of reinforcement members disposed therein.

18. The electric vehicle of claim 14, wherein the plurality of cross beams are welded to the opposed longitudinal outer rails.

19. The electric vehicle of claim 14, wherein the pair of opposed longitudinal inner rails are spaced apart from the opposed longitudinal outer rails.

20. An electric vehicle comprising:
   a vehicle body including a pair of opposed longitudinal outer rails;
   a plurality of cross beams extending in a transverse direction of the electric vehicle and secured to the pair of opposed longitudinal outer rails, each cross beam of the plurality of cross beams includes a plurality of reinforcement members disposed therein;
   a pair of opposed longitudinal inner rails located inboard of the opposed longitudinal outer rails and between two cross beams of the plurality of cross beams, the pair of opposed longitudinal inner rails secured to the two cross beams to form a box, each longitudinal inner rail of the pair of opposed longitudinal inner rails includes a plurality of reinforcement members disposed therein;
at least one housing connected to the box and configured to be connected to a motor of the electric vehicle;
a first set of bushings at least partially supported by the at least one housing;
a plurality of first fasteners extending through respective first bushings of the first set of bushings and configured to extend through the motor to secure the respective first bushings to the motor;
a second set of bushings at least partially supported by the at least one housing; and
a plurality of second fasteners extending through respective second bushings of the second set of bushings and the box to secure the respective second bushings to the box,
wherein the first set of bushings has a first stiffness and the second set of bushings has a second stiffness, the first stiffness is greater than the second stiffness, and
wherein each bushing of the first set of bushings has a cylindrical shape that extends in a vertical direction, and wherein each bushing of the second set of bushings has a cylindrical shape that extends in a direction perpendicular to the vertical direction.

* * * * *